United States Patent [19]

Siryj et al.

[11] Patent Number: 4,502,133
[45] Date of Patent: Feb. 26, 1985

[54] AUTOMATIC HANDLING MECHANISM FOR AN OPTICAL DISC ENCLOSED IN A PROTECTIVE CARTRIDGE

[75] Inventors: Bohdan W. Siryj, Cinnaminson; Angelo G. Lazzery, Oaklyn, both of N.J.

[73] Assignee: RCA Corporation, New York, N.Y.

[21] Appl. No.: 445,489

[22] Filed: Nov. 30, 1982

[51] Int. Cl.³ .......................... G11B 17/00; G11B 5/48
[52] U.S. Cl. ......................................... 369/34; 369/36; 369/38
[58] Field of Search .................. 369/33, 34, 36, 38

[56] References Cited

U.S. PATENT DOCUMENTS

| | | | |
|---|---|---|---|
| 4,097,895 | 6/1978 | Spong | 358/128 |
| 4,170,030 | 10/1979 | Castrodale et al. | 369/38 |
| 4,222,071 | 9/1980 | Bell et al. | 358/128.5 |
| 4,271,489 | 6/1981 | Siryj et al. | 369/38 |
| 4,273,342 | 6/1981 | Gilson et al. | 369/32 |
| 4,286,790 | 9/1981 | Siryj et al. | 369/36 |

OTHER PUBLICATIONS

Megadoc, A Modular System for Electronic Document Handling", J. A. deVos, *Phillips Technical Review*, vol. 39, 1980, No. 12, pp. 329-343.

*Primary Examiner*—Steven L. Stephan
*Attorney, Agent, or Firm*—Joseph S. Tripoli; Robert L. Troike; Christopher Lyle Maginniss

[57] ABSTRACT

A high speed data storage and retrieval system for use with disc record media includes a storage module for holding a plurality of discs, a read/write station and a changer apparatus for transporting discs between the storage module and the read/write station. In a preferred embodiment the storage discs are enclosed in a protective cartridge and held in place in the cartridge so that the recording surfaces of the disc do not touch the inside surfaces of the protective cartridge. The changer apparatus includes a pair of belt elevators. One of the elevators designated the "up" elevator transports a selected disc from the storage module to the read/write station. After processing, the selected disc is returned to the storage module via a second elevator which is designated the "down" elevator. A pivot block assembly is used to aid in the transfer of disc from the "up" elevator to the read/write station and from the read/write station to the "down" elevator. Additionally, the read/write station is provided with an ejector assembly for locating the cartridge and disengaging the disc inside of the cartridge and for ejecting the cartridge/disc assembly from the read/write station into the "down" elevator position. Further, the read/write station is provided with a parallelogrammatic spindle for insuring concentric location of the disc when mounted on the turntable.

12 Claims, 16 Drawing Figures

AUTOMATIC HANDLING MECHANISM FOR AN OPTICAL DISC ENCLOSED IN A PROTECTIVE CARTRIDGE

The government has rights in this invention pursuant to a Contract No. F30602-81-C-0318 awarded by the Department of Air Force.

The present invention relates to record disc systems for use in recording and retrieving information from a disc record and, more particular, to a system for recording and retrieving information wherein the disc records are automatically transported from a storage location to a read/write location and back to the storage location after processing is complete.

BACKGROUND OF THE INVENTION

High density optical recording systems which may be used for recording and playing back information are known in the prior art. For example, U.S. Pat. No. 4,097,895, entitled "MULTI-LAYER OPTICAL RECORD" issued on June 27, 1978, in the name of F. W. Spong relates to an optical disc record/playback system wherein data is recorded on the surface of a recording medium. In a Spong system the thermal energy of a focused high intensity light beam causes variations of the optical properties on the surface of the recording medium, for example, in one system the thermal effects of a laser beam form pits in an absorptive coating on the surface of an optical disc. In the Spong system, approximately $10^{11}$ bits of information can be recorded on one side of a disc-shaped record medium having a 30 centimeter diameter.

In some optical recording systems, it is desirable to provide a mass memory system in which any data in a store of approximately $10^{13}$ bits, i.e., 100 record media, could be automatically accessed in a few moments. In one system a library of several record media are stored in a storage bin of an optical mass memory system. A mechanism is used for transferring a selected disc from the storage bin to a read/write station where the information may be processed. Such mechanisms must be capable of automatically selecting the correct disc, automatically handling the disc into and out of the read/write station and automatically returning the disc to a storage location after processing is complete. Automatic handling of this type must be accomplished reliably and accurately to be able to access the data at a high rate of speed.

SUMMARY OF THE INVENTION

In accordance with the principles of the present invention a record medium transport and centering apparatus is provided in an automatic handling system for optical discs. The transport mechanism is arranged for handling the record medium into and out of the read/write station and the centering mechanism is used for holding and centering the record medium during the read/write process.

In accordance with one aspect of the present invention a data processing system is provided for use in recording and retrieving information which is being recorded on a surface of a disc-shaped record medium. The data processing system includes a storage module for storing a plurality of record media and a user station for recording and retrieving back information. A transport means is provided for transporting the record media from the storage module to the user station and from the user station to the storage module. The transport means includes a first transfer means for transferring a selected record medium from a first transport position to an incoming position proximate to said user station and a second transfer means for transferring the selected record medium from an outgoing position to a second transport position. Further, the system includes holding means for holding the selected record medium and for conveying the selected record medium from the incoming position to the user station. An alignment means aligns the selected record medium such that the selected record medium is positioned in the incoming position while the holding means engages the selected record medium. The alignment means is biased to support the selected record medium while the holding means engages the selected record medium and is biased to release the selected record medium while the holding means conveys the selected record medium to the user station. Further, the alignment means aligns the selected record medium in the outgoing position when the selected record medium is transferred from the user station to the outgoing position, thus preventing the record medium from being transferred into the incoming position.

In accordance with a further aspect of the present invention the apparatus is provided with release means. The selected record medium is enclosed in a cavity of a protective cartridge including releasable engagement means for holding the selected record medium in the protective cartridge such that a recording surface of the record medium is spaced from a corresponding surface of the cavity. The release means activates the releasable engagement means and ejects the record medium from the user station to the outgoing position. In operation the release means is operable in a first mode for affecting the engagement means such that the selected record medium is free to rotate within the cavity and is operable in a second mode for affecting the engagement means such that the selected record medium is held in the cavity such that the record surface is spaced from the corresponding surface.

In accordance with another aspect of the present invention spindle means are provided for supporting the record medium in a play/record position in the user station. The spindle means includes a tapered centering plug which engages a center hole in the record medium. The tapered centering plug has a rotary axis which is coincident with a rotary axis of the disc-shaped record medium. Additionally, the spindle means includes a pair of diaphragms connected to the tapered centering plug in a parallelogrammatic fashion such that the pair of diaphragms restrict motion of the tapered centering plug to motion parallel to the rotary axis of the tapered centering plug.

DESCRIPTION OF THE PREFERRED EMBODIMENTS

Figure 1:
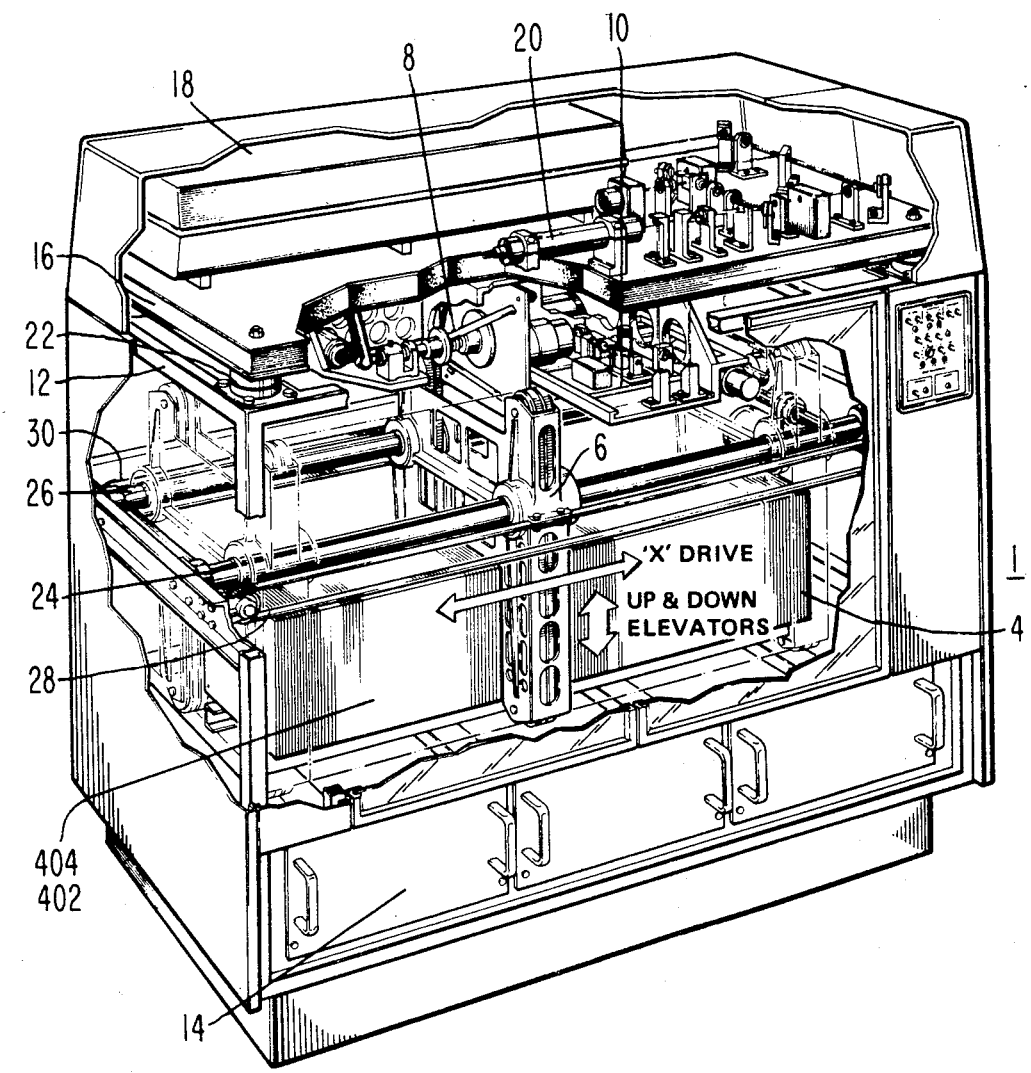
FIGS. 1, 2 and 3 are cut-away perspective, side and front views respectively of an optical disc player apparatus embodying the principles of the present invention.

Reference will now be made to FIGS. 1, 2, 3 and 4 which show perspective, side and front views of an optical disc player/recorder apparatus 1 and a plan view of a disc/cartridge package 402, 404 respectively. In the FIGURES elements designated with like reference numerals are the same or similar items in the various FIGURES. Disc 404 is permanently housed in cartridge 402. The player/recorder 1 is a modular design comprising a storage module 4, a changer module 6 and a read/write module 8. Player/recorder 1 may be used with double-sided or single-sided optical discs. In the explanation that follows single-sided discs will be understood. Record/play module 8 will record and playback data from a disc with record playback head 10.

A structural steel assembly 12 provides the framework for the player. Panel 14 encloses the player. Optical platform 16 is located above read/write module 8.

Cartridges 402 are stored in the lower part of the unit in storage module 4. Located below the disc storage module 4 is a compartment which may contain the electronics necessary to operate the player/recorder. Located above the disc storage module 4 is the disc changer module 6 which is a mechanism that picks up a cartridge from its stored position and transports it to read/write module 8 for record or playback. Following record or playback, changer module 6 returns the cartridge to storage module 4.

The optics platform 16 is located above read/write module 8. Lasers 18 and 20 and their associated optics are affixed to the optical platform 16. Laser 18 may be a high powered laser (illustratively, a water cooled argon laser) which provides a light beam to read/write station 8 for writing data or reading back data on the disc located in the read/write position. Laser 20 which may be of a low power (illustratively, helium/neon laser) provides the light beam to read/write station 8 for focusing, i.e., to maintain the objective lens in a proper position with respect to the disc surface. Laser 20 may be positioned in the read/write module in one embodiment rather than on optics platform 16. Optical platform 16 is mounted by means of vibration isolators 22 to the frame member 12. Suspending optical platform 16 via the vibration isolators 22 prevents vibratory motion from external sources from adversely affecting the record or playback operations. Both the cartridge and the disc are locked in place during the read/write operation. The disc is locked to a rotating vacuum chuck which will be discussed herein.

Figure 2:
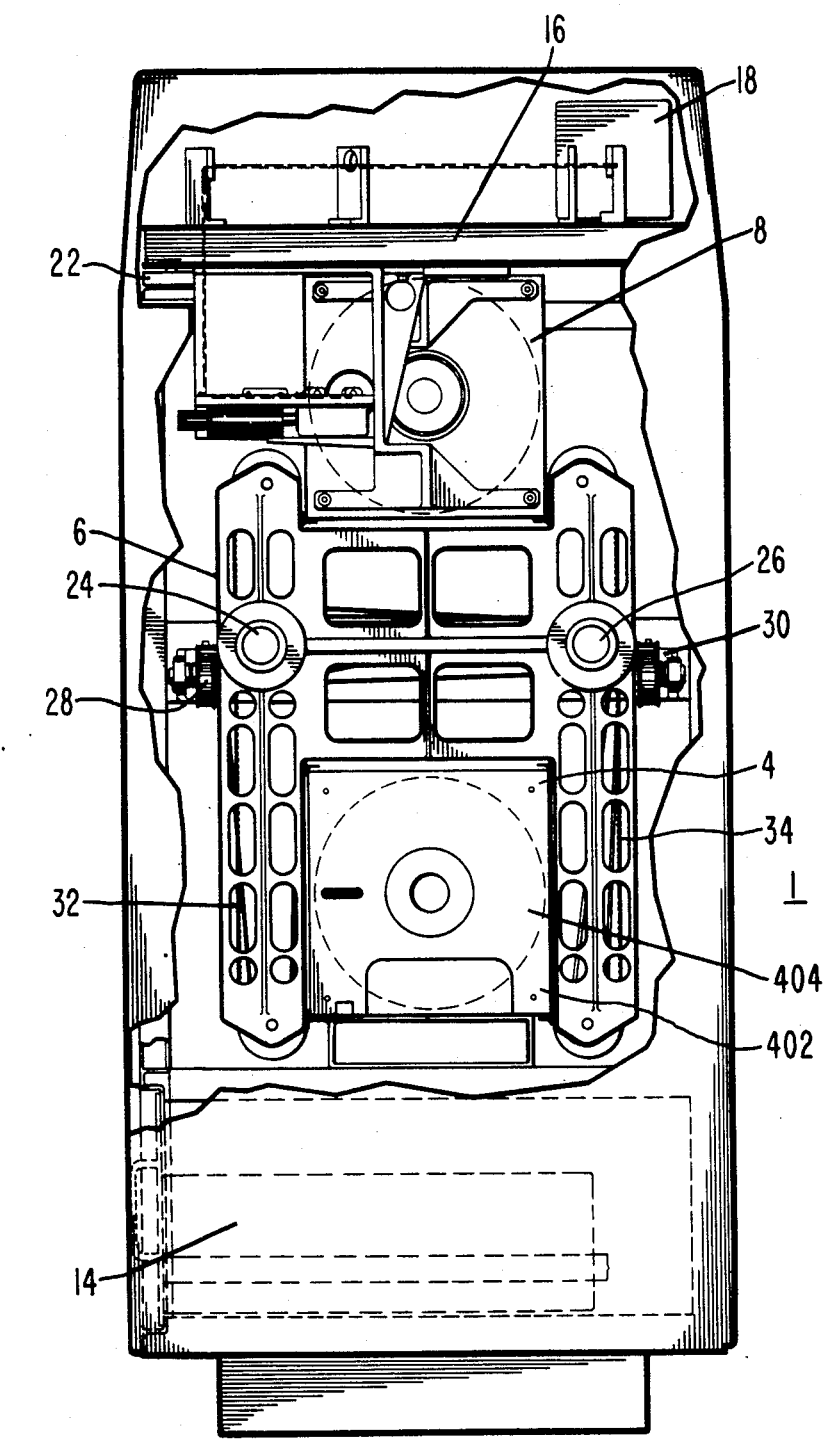
Figure 3:
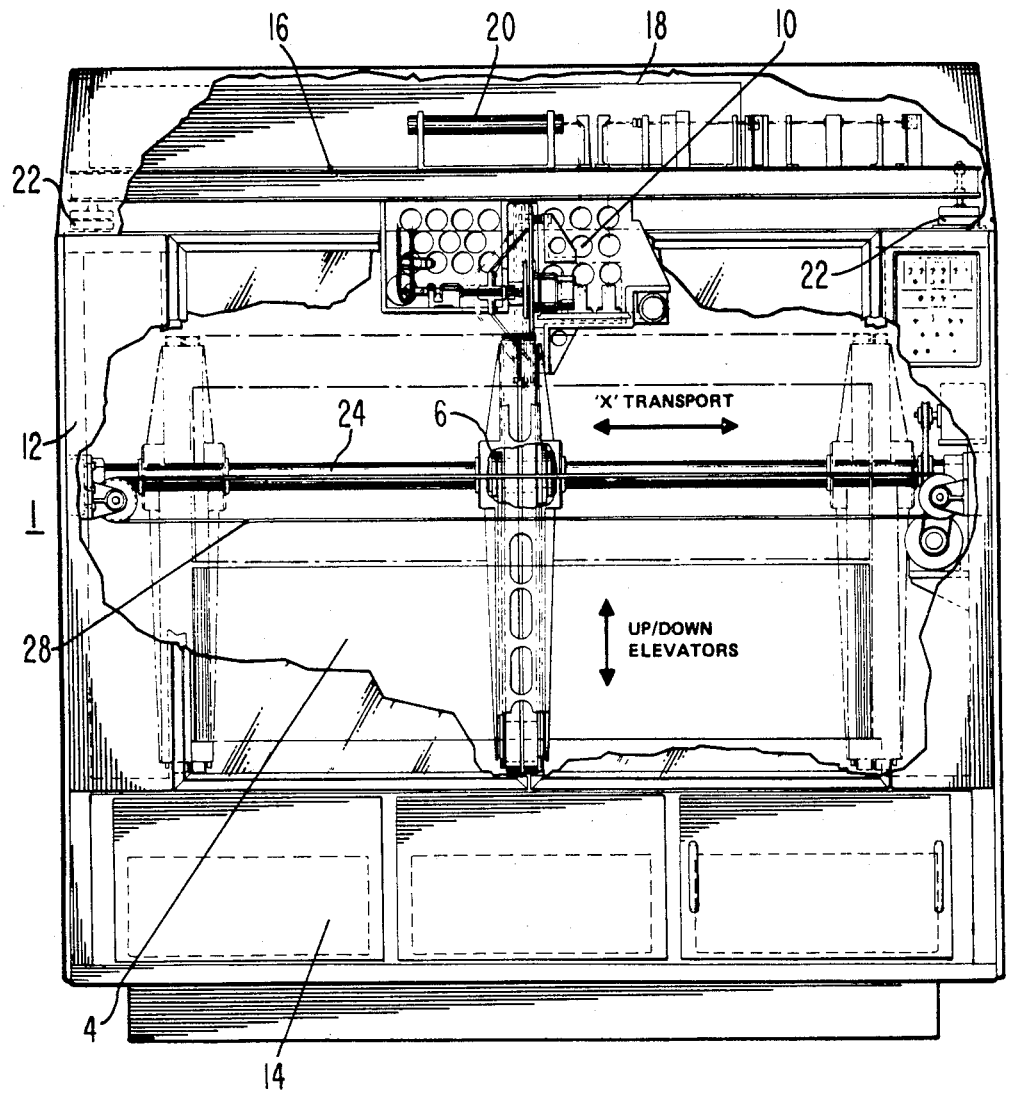

The disc changer module 6 is shown in FIGS. 1, 2 and 3. It is composed of one "X" transport and two "Y" transports. The two "Y" transports minimize access time because they permit one transport to hold a cartridge in very close proximity to the read/write module 8 while another cartridge which is in place on the read/write module 8 is unloaded into the other "Y" transport. With respect to FIGS. 1 and 3 the "X" transport moves to the right or left while one of the "Y" transports moves up and will be termed an "up" elevator and the other "Y" transport moves down and will be termed a "down" elevator. Both elevators are supported on two horizontal shafts 24, 26. The elevators are driven and controlled in the "X" direction by two timing belts 28 and 30. Belts 28, 30 are connected to a servo motor (not shown) for moving changer module 6 in the "X" direction. Mounted to the shaft of the servo motor is an encoder with a once around indication for providing position information. The encoder bits are used for both module location and speed control.

The operational concept for both elevators is the same and will be described with reference to FIG. 2. Two counter-rotating wide belts 32, 34 straddle the width of cartridge 402. Attached to timing belts 32, 34 are cleats (not shown) which support, elevate and lower cartridge 402. Shafts 24 and 26 are used as separate driving sources for the two elevators. The rotary motion (supplied by a motor which is not shown) is transmitted by shafts 24, 26 to the elevators belts 32, 34. The changer module 6 and its structure are designed so that it straddles the disc storage module 4, thus maintaining the cleats in constant readiness to elevate a selected cartridge.

Cartridges are stored and retained individually in storage module 4. Separate slots (not shown) retain and space the cartridges in the "X" direction. Each cartridge includes a human identifiable and machine decodable tag on the outside. Every time the player is started the changer module traverses the storage module logging cartridge identifications into memory. Thus, when a particular disc is selected changer module 6 is driven to the storage module location for that disc.

Figure 4:
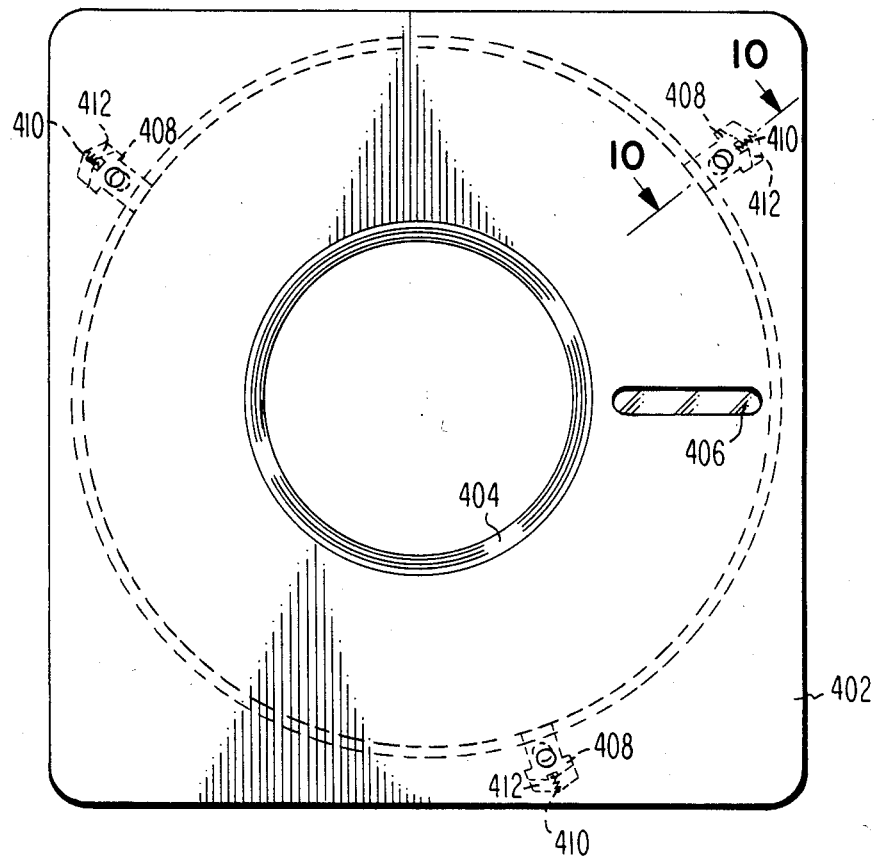
FIG. 4 is a plan view of a protective cartridge having a disc record enclosed therein.

Referring to FIG. 4, protective cartridge 402 encloses disc record 404. Cartridge 402 provides dust, debris and handling protection for the information bearing surfaces of the optical disc record 404. The disc record is used in the optical record playback system of FIGS. 1–3. A light beam from high power laser 18 is focused onto the information surface of disc record 404 through window 406. Recording is achieved when the intensity of the focused light beam is of sufficient magnitude to affect the recording layer on the surface of the disc record. Illustratively, the disc record in this system may be of a type described in U.S. Pat. No. 4,222,071 entitled "INFORMATION RECORD" issued on Sept. 9, 1980, in the name of A. E. Bell. In accordance with one technique, the focused light beam effects ablation of the recording surface. According to the ablation technique, the recording layer vaporizes or melts forming a pit therein. With suitable modulation of the intensity of the light beam in accordance with the recording signal, as successive regions of the disc record pass through the light beam path, an information track may be formed comprising pits in regions where the material is ablated separated by undisturbed regions of the recording layer (that were not subject to exposure by the high intensity beam).

In the playback mode the intensity of the light source is set at a constant level, which is below the recording level. The light beam follows the previously described information track on the disc record surface. The intensity of the light falling upon a photodetector alternates between a minimum level and a maximum level as the successive regions of the information track pass through the path of the focused beam. The output of the photodetector comprises a signal that varies in consonance with the pit edge spacing variations passing through the focused beam path. The output of the photodetector may be applied to suitable signal processing circuitry for recovering the information recorded on the disc record surface.

According to the present invention, cartridge 402 is equipped with a plurality (e.g., 3) spring loaded finger members 408. Finger members 408 are biased by springs 410 located in cavity 412 to press against the outside rim of disc record 404 when the record package is located in storage module 4 and being transported. A description of the operation of finger members 408 will be provided herein.

Figure 5:
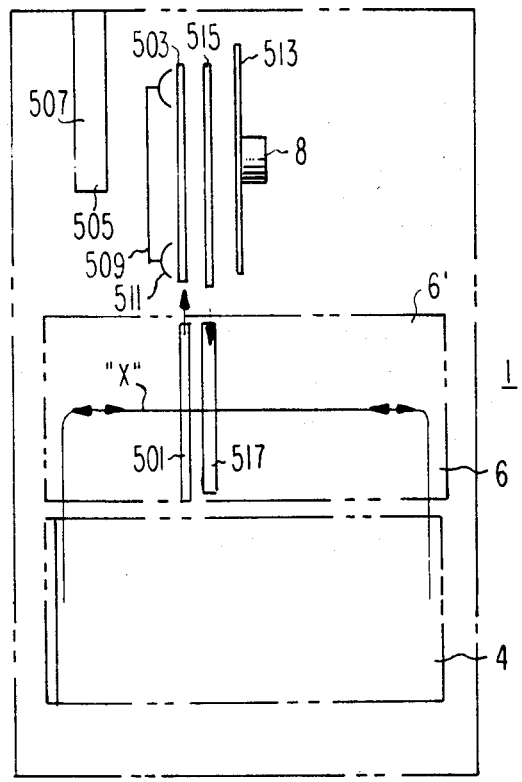
FIG. 5 is a schematic representation of the optical disc player apparatus of FIG. 1 for use in explaining the players' operation.

Referring to FIG. 5, a description of the system operation will be provided. The optical recorder/player comprises storage module 4, changer module 6 and read/write station 8. In accordance with the system, a disc from storage module 4 is selected by changer 6 and transported by the "up" elevator into the transport position which is located in the area indicated by 6'. In this position the selected disc is moved into a position 501 just below the read/write station 8. The selected disc is elevated from the position 501 into an incoming position 503. From this position the disc in the 503 position is moved into the read/write station 8 by action of mechanism 505 which consists of arm 507 and plate 509. Attached to plate 509 are a plurality (e.g., 4) of suction cups 511. As the suction cups engage the cartridge in location 503 vacuum is applied to the suction cups so that the selected disc enclosed in its cartridge travels with arm 507 and plate 509 into the read/write position 513. In read/write position 513 the disc is processed according to the users' requirements. After processing the disc is moved out of the read/write position 513 into the outgoing position 515. From position 515 the disc is lowered by the "down" elevator to position 517. From position 517 the disc may be returned to the storage module 4 by the changer 6.

Figure 6:
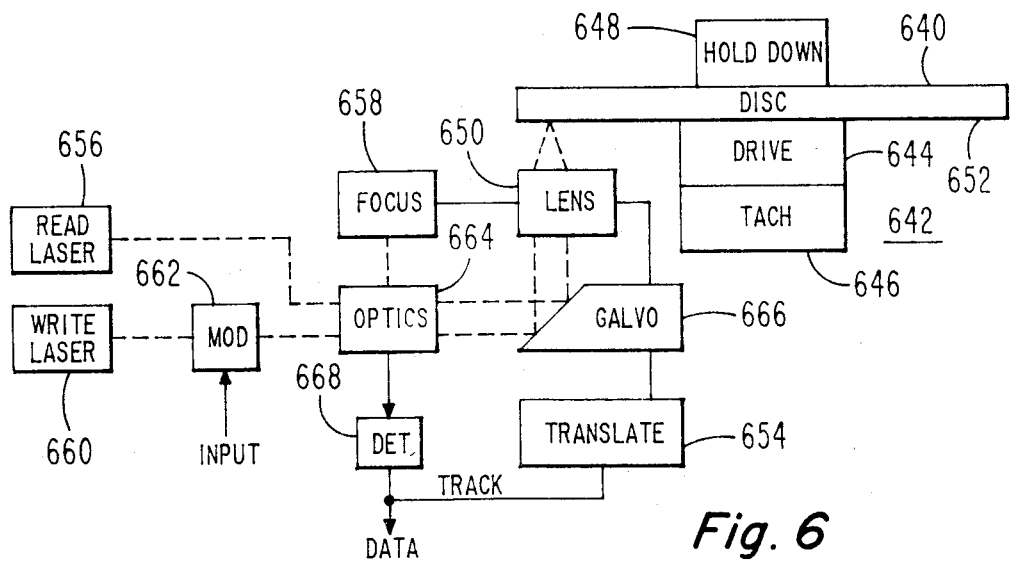
FIG. 6 illustrates, via a block diagram representation, a functional description of the assembly of the read/write station of the apparatus of FIG. 1.

The read/write module 8 provides the functions of record, read and data verification. Referring to FIG. 6, a functional diagram for read/write module 8 is shown. In operation, disc 640 (the cartridge is not shown in this functional arrangement) is placed on turntable 642 which includes drive 644, tachometer 646 and holddown 648. Disc 640 is held in place by activating holddown mechanism 648. After disc 640 is clamped in place, disc drive 644 is activated to rotate disc 640 at a predetermined angular speed, as measured by tachometer 646. Before a read or record operation can proceed, however, focus lens 650 must be positioned under the desired portion of the disc and arranged such that the light beam is focused onto the surface 652 of disc 640. Lens 650 is positioned with respect to disc 640 by a motor driven translation stage 654. When lens 650 is properly positioned with respect to the disc surface, read laser 656 is turned on so that a proper focus setting may be obtained. Focus is achieved by a servo-loop (not shown) which operates from the light from a focus laser (shown as element 20 of FIG. 1) reflected from disc surface 652. A lens positioner 658 maintains the focus distance from disc surface 652 during both record and read operations. After focus has been achieved, the desired operation may be initiated. In the record mode write laser 660 is activated. It should be noted that write laser 660 and read laser 656 may be implemented as a single laser with optics which split the source to either pass through modulator 662 for the write laser beam or bypass modulator 662 for the read laser beam. The modulated record beam is directed to disc 640 via optics 664 and galvanometer controlled mirror 666. The modulated record beam is focused on disc surface 652 to form a series of pits of varying duration and spacing as the disc rotates. The resultant track that is formed contains the recorded information. When the information is to be recorded in concentric tracks, recording in a second track requires inactivating the record laser for a short period while lens 50 is repositioned to a point on disc 640 where the next track is to be recorded. This repositioning takes place very quickly (for example, less than 1 millisecond) and may be accomplished by moving the galvanometer 666 via translation stage 654. The translation stage 654 moves in increments (for example, four track spacings) and intermediate positions may be obtained by commanding the galvanometer 666 to tilt slightly. After repositioning takes place, write laser 660 is reactivated and a second track of data is fed into modulator 662 for recording. This sequence will repeat for as long as data is available for recording. To insure that the desired track may be found during read a unique address is recorded with each track. It should be noted that the information may be recorded in a spiral format on the disc surface by moving translation stage 654 at a constant rate across the surface of the disc.

In the read mode the write laser is turned off. When lens 650 is positioned and focus is achieved the track servo is activated causing the read beam to lock onto the track nearest the center of the optical field of view. The track servo uses the galvanometer 666 for steering the beam in response to the detected signal from detector 668. The difference between the track being followed and the desired track is used to reposition the galvanometer and translation stage to the location of the desired track. When the proper track is being read, the data may be outputed from detector 68 to suitable processing circuitry (not shown).

Data verification during recording may be achieved by reading the information just after it has been recorded. The position of the focus read laser spot is adjusted so that it illuminates the pits being recorded just after recording takes place. Thus, the output data from the write/read module during a record operation may be compared to that which is input. If an error is encountered in the read process the data may be rerecorded and again verfied for accuracy.

Figure 7:
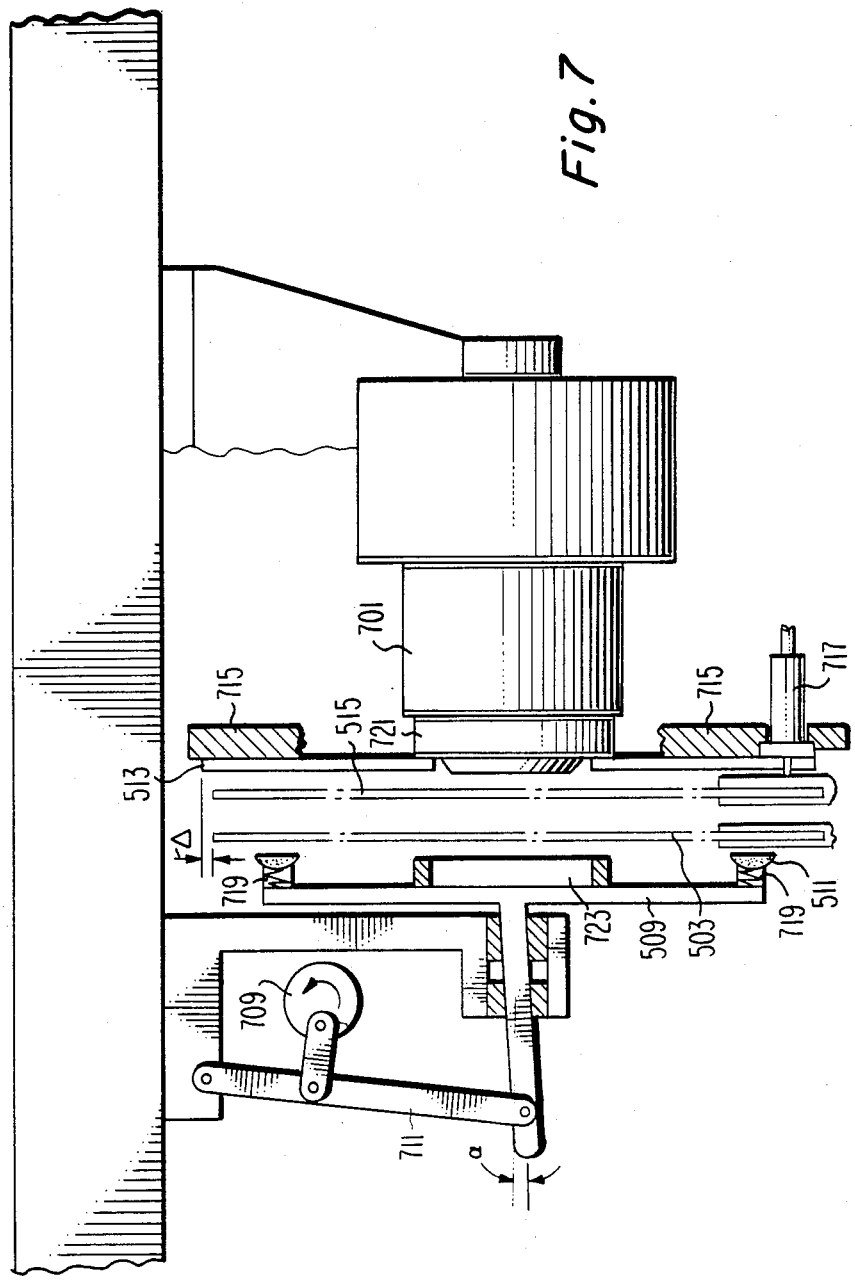
FIGS. 7 and 8 are plan and top views respectively of the automatic load/unload mechanism of FIG. 1 embodying the principles of the present invention.
Figure 8:
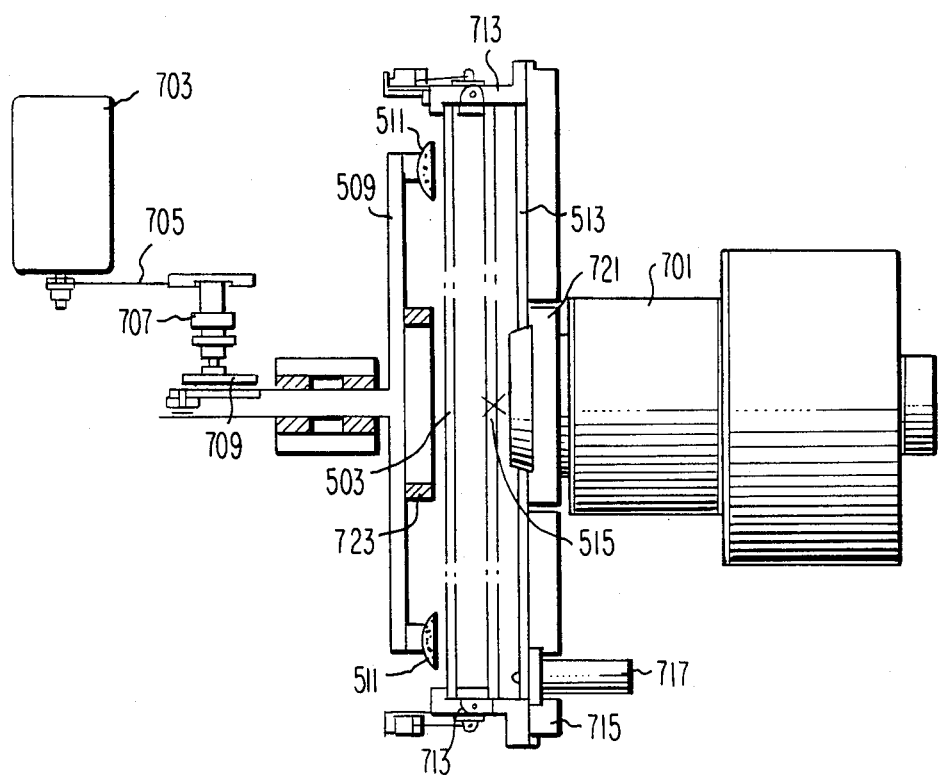

The operation of the load/unload mechanism will now be explained with reference to FIGS. 7 and 8 which show side and top views respectively of the mechanism. The function of the automatic load/unload mechanism is to accurately locate the disc/cartridge assembly into the turntable assembly, spin the disc up to speed while it is within the cartridge, and then after completion of the record/play operation guide, unlock and eject the cartridge/disc assembly into the "down" elevator position.

The "up" elevator positions the cartridge into the incoming position 503. In this position the cartridge is ready to be loaded onto the turntable assembly 701. The loader motor 703 is coupled via belt 705 to clutch 707. The clutch is pulsed such that the rotary motion of the clutch is transmitted through the clutch to link 709. The vacuum cup plate 509 and vacuum cups 511 are moved linearly by linkage 711. The linkage 711 moves the suction cup plate 509 at a slight angle $\alpha$ with respect to the horizontal. Angle $\alpha$ insures that clearance is established between the incoming cartridge and the cleats (not shown) of the "down" elevator. As the cartridge is moved from the incoming position 503 to the turntable 701 the bottom of the cartridge clears the cleats of the "down" elevator. Vacuum cup assembly 509 approaches the cartridge. Before vacuum cups 511 contact the cartridge the vacuum is established so that when the vacuum cups encounter the face of the cartridge in position 503 the vacuum cups 511 take hold. The cartridge which is in position 503 resists being pushed toward the turntable assembly 701 by the torsion springs of pivoting blocks 713. The pivoting blocks 713 will be described herein. The vacuum cups take hold of the cartridge and, as soon as the vacuum cup assembly overcomes the restraining force of the pivoting blocks 713, the vacuum cup assembly and cartridge, as a unit, move toward the turntable assembly 701.

The motion of the link 709 is sinusoidal so that the cartridge starts out slowly, travels faster at the midpoint and slows down just before the reference plate 715 is contacted. As the cartridge passes through the pivoting blocks 713 the spring actuated pivoting blocks return to their original position ready to locate the cartridge into the "down" elevator position 515 following cartridge ejection. As the cartridge approaches reference plate 715 ejector assembly 717 are contacted. The purpose of the ejector assembly 717 is to both position the cartridge and unlock the disc from the cartridge when it is in the read/write position 513. One of the goals of this load cycle is to insure that the recording surface of the disc does not contact the inside cartridge wall. One of the functions of ejector assembly 717 is to unlock the disc inside of the cartridge while insuring that there is no contact. The operation of ejector assembly 717 will be explained herein.

The selected cartridge contacts reference plate 715 before the end of the travel of vacuum cup assembly 509. The vacuum cup assembly interface is spring loaded by springs 719. The vacuum cups stop moving while the vacuum cup assembly with disc engagement pad 723 continues to move forward in order to insure that the selected disc contacts vacuum chuck 721 before the vacuum cups release the disc. Engagement pad 723 is made of sponge rubber so that it will collapse when necessary to act as a spring.

The mode cycle is complete when the vacuum cups assembly moves back a small amount (e.g., 3/16 inch). At this time the vacuum cups hold the cartridge in position 513 against reference plate 715, however, the vacuum has been removed. Just before the cartridge contacted the reference plate, vacuum to vacuum chuck 721 and reference plate 715 was turned on. Thus, the vacuum from the vacuum chuck holds the cartridge in place at this time. The over travel of the vacuum cup assembly insures that the disc is held onto the vacuum chuck physically before the vacuum cups release the cartridge. It should be noted that vacuum cups 511 are permitted to float (they may be mounted in sponge rubber) thus as the pins of the ejector assembly contacts the apertures in the cartridge, it may shift slightly to align on the pins.

After the read/write operation and the disc has stopped rotating, the tapered pins of ejector assemblies 717 are retracted permitting the disc locks to engage and hold the disc in the center of the cartridge prior to removal. Simultaneously, the vacuum is removed from the vacuum chuck 721. It should be noted that at some previous time the vacuum cup assembly has been relocated into position for the next load operation. After the vacuum is removed from reference plate 715 the cartridge is ejected into outgoing position 515. The ejection motion is controlled by the spring pressure from ejector assemblies 717. The relative position of pivoting blocks 713 on one side of the cartridge and ejectors 717 on the other side maintain the cartridge in a vertical position supported by the cleats (not shown) of the "down" elevator. The cartridge is then removed from the outgoing position 515 by actuating the "down" elevator. As soon as another selected cartridge is in the incoming location 503 loader motor 703 may be started and the load cycle repeated.

Figure 9:
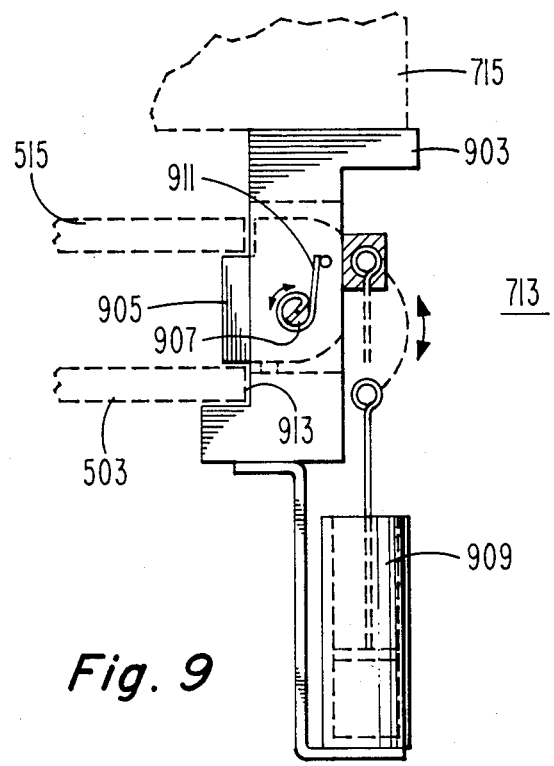
FIG. 9 is a detailed schematic of the pivoting block assembly of FIG. 8 embodying the principles of the present invention.

Referring to FIG. 9 a plan view of pivoting block assembly 713 is shown. Pivoting block assembly includes frame member 903 which is coupled to reference plate 715 shown in phantom. Pivoting block 905 is free to pivot about pivot pin 907 connected through mounting block 903. Damper assembly 909 is connected to pivoting block 905 to provide smooth operation of the pivoting block 905. Torsion spring 911 is provided on the pivoting guide assembly to perform three functions. First, torsion spring 911 biases pivoting block 905 in a position to form a slot 913 as a guide to the selected cartridge which is positioned in incoming position 503. The torsion spring also restrains the cartridge in position 503 while the vacuum cup assembly (not shown) is gripping the cartridge in position 503 for transport into the read/write position. Further, the torsion spring biases pivoting block 905 so that it returns to the ready position forming slot 913 after the selected cartridge has moved into the read/write position. Damper assembly 909 prevents the pivoting block 905 from snapping back after the selected cartridge has been moved into the read/write location. Damper assembly 909 smoothes the operation of the pivoting block 905 to minimize vibrations which may be transmitted through the system. At the completion of a read/write operation the cartridge in the read/write position is ejected into the "down" elevator, outgoing, position 515. For this ejection operation pivoting block 905 is positioned such that a cartridge moving into the "down" elevator position 515 will not pass through to the incoming position 503.

Figure 10:
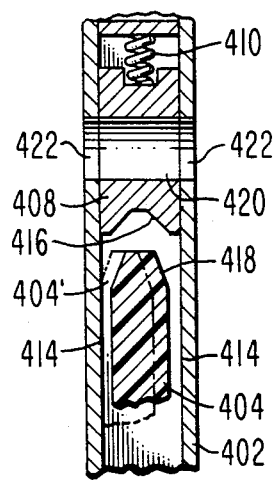
FIG. 10 is a cross-sectional side view of a portion of the protective cartridge and disc record of FIG. 4 taken across section lines 10—10.

Referring to FIGS. 10 through 13 the operation of ejector assembly 717 will be explained. In FIG. 10 a partial cross-sectional view through lines 10—10 of FIG. 4 is shown. Disc record 404' is shown in phantom. The outside rim of disc 404' is free to translate so that the information surfaces of disc record 404' may contact the inside surfaces 414 of cartridge 402. Contact between the information surfaces of disc record 404' and the inside surfaces 414 of cartridge 402 may adversely affect the operation of an optical system, for example, scratches or the like may be cut into the information surfaces of the disc obliterating certain portions of an unrecorded or recorded disc.

The finger members 408 are provided to prevent contact, their operation is as follows. Disc record 404 is shown disposed in cartridge 402 with the information surface of disc record 404 spaced from the inside surface 414 of cartridge 402. Finger member 408 is provided with a V-shaped disc contacting surface 416. A complementary V-shaped rim 418 is provided on the outside rim of disc record 404. When finger member 408 engages the rim of disc record 404 the disc record 404 is suspended in the cavity of cartridge 402 such that the information surfaces of disc record 404 are substantially equally spaced from the inside surfaces 414 of cartridge 402. In FIG. 10, finger member 408 is shown having aperture 420 which is formed therethrough (illustratively, aperture 420 is round) aligned with aperture 422 which is formed through cartridge 404 (illustratively, aperture 422 is round and of the same diameter as 420). In storage, finger member 408 is biased by spring 410 such that it slides into contact to press against the outside rim 418 of disc record 404. Thus, the three finger members 408 contact the rim of disc record 404 to maintain appropriate spacing between the information surfaces of disc 404 and the inside surfaces of cartridge 402.

Figure 11:
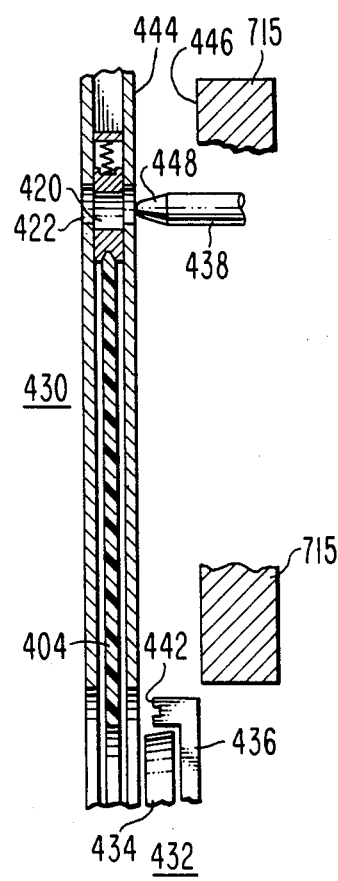
FIG. 11 is a cross-sectional side view of the protective cartridge and disc apparatus of FIG. 4 showing the disc and cartridge being mounted onto a spindle of an optical player.
Figure 12:
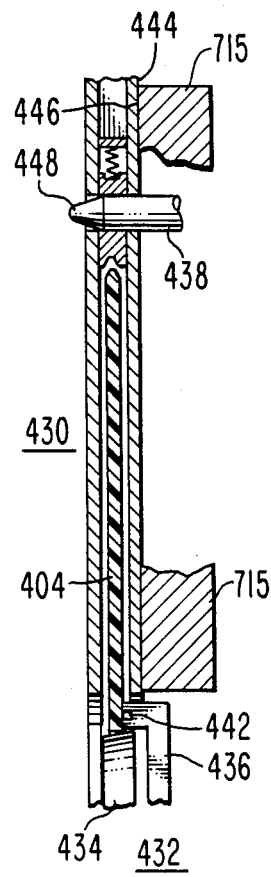
FIG. 12 is a cross-sectional side view of the protective cartridge and disc of FIG. 4 showing the disc and cartridge mounted on a spindle of an optical player.

Referring to FIGS. 11 and 12, the operation of the record package in the optical player will be explained. In FIG. 11, record package 430 is positioned in a loading position with respect to the spindle 432 of the optical player. Spindle 432 includes a hub member 434 and a hold-down member 436. In the loading position record package 430 is positioned just before pin 438 engages the aperture in the record package (it will be noted that three pins would be provided in the optical player positioned to align the apertures in the cartridge with the apertures in the finger members).

Referring to FIG. 12, the record package 430 is shown positioned on the spindle 432 against reference plate 715 with pin 438 inserted. As spindle 432 engages the spindle hole in disc 404, pin 438 engages and aligns the apertures through the cartridge. Pin 438 disengages the finger members from the outside rim of disc record 404. Pin member 438 is tapered on tip 448 such that as the pin enters aperture 432 the tapered tip 448 enters aperture 420. As record package 430 is pressed against reference plate 715 pin 438 aligns apertures 420 and 422. Spindle 432 includes hub member 434 which aligns the center of the disc record 404 with respect to the center of rotation of spindle 432. Hold-down member 436 engages an inside portion of disc record 404 by means of a vacuum provided around groove 442. Outside surface 444 of cartridge 402 is positioned against reference surface 446 of reference plate 715. With finger member 408 disengaged from the outside rim of disc record 404, disc 404 may be rotated within cartridges 402. This is accomplished by the rotation of spindle 432.

Figure 13:
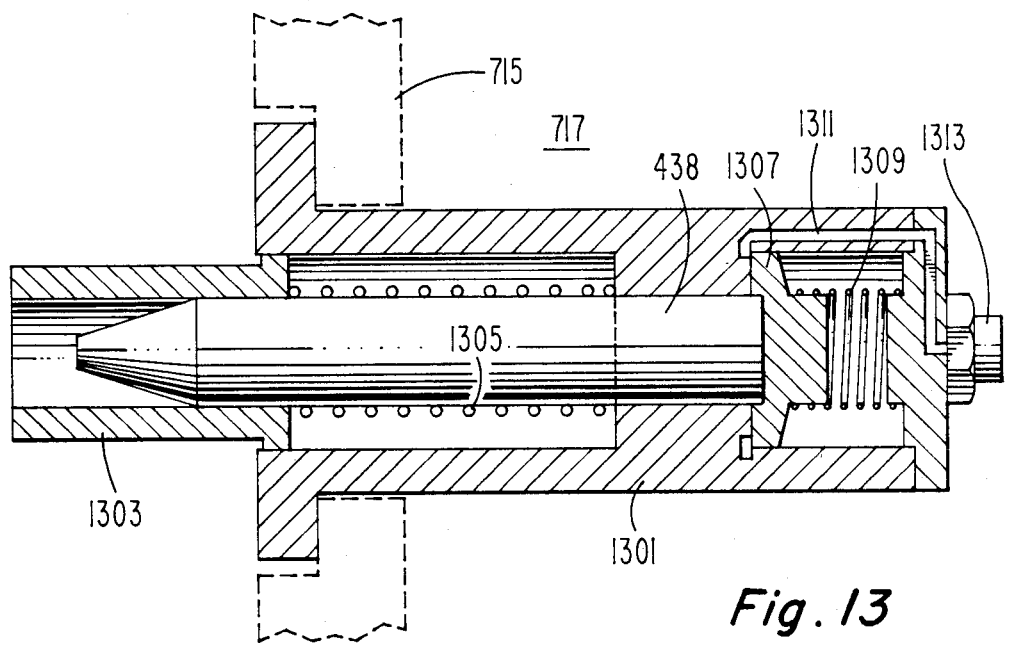
FIG. 13 is a detailed schematic drawing of the ejector assembly of FIGS. 7 and 8 embodying the principles of the present invention.

Referring to FIG. 13, a partial cross sectional view of ejector assembly 717 is shown. Ejector assembly 717 includes frame member 1301 and pin 438 which is slidably housed therein. Ejector 1303 is slidably mounted around pin 438 and biased outward by spring 1305. Piston 1307 is coupled to pin 438. Spring 1309 biases piston 1307 and pins 438 to the left as shown in the figure. Air port 1311 is provided from air nozzle 1313 to provide the air to move piston 1307 and pin 438. Frame member of ejector assembly 717 is connected to reference plate 715 shown in phantom.

In operation, ejector assembly 717 is positioned such that pin 438 will engage apertures 420 and 422 in cartridge 402 as a selected cartridge is mounted in the read/write position. As a cartridge is positioned in the read/write position ejector 1303 is cocked by compressing spring 1305. When the cartridge is positioned in the read/write location pin 438 releases the fingers from the rim of the disc so that the disc may rotate freely within cartridge. As mentioned earlier it is important that disc 404 be restrained during the mounting and unmounting operation such that the recording surfaces thereof do not touch the inside surfaces of cartridge 402.

After the read/write operation is complete for a selected disc the disc is held in place on the spindle and the cartridge is held on the reference plate while the ejector pins 438 are retracted. This is accomplished by providing air through air port 1311 to move piston 1307 to the right as shown in FIG. 13. Referring back to FIGS. 11 and 12, as ejector pin 438 is retracted from the apertures 420 and 422 of cartridge 402 finger member 408 is urged by spring 410 to engage the rim of disc 404 to hold disc 404 in the cavity of cartridge 402. At this time the vacuum to the spindle and reference plate may be released so that the cartridge can be moved into the outgoing position ready for transport back to the storage module. To move the cartridge, ejector 1303 pushes the cartridge into the outgoing position, spring 1305 urging ejector 1303 to the left as shown in FIG. 13.

Figures 14, 15:
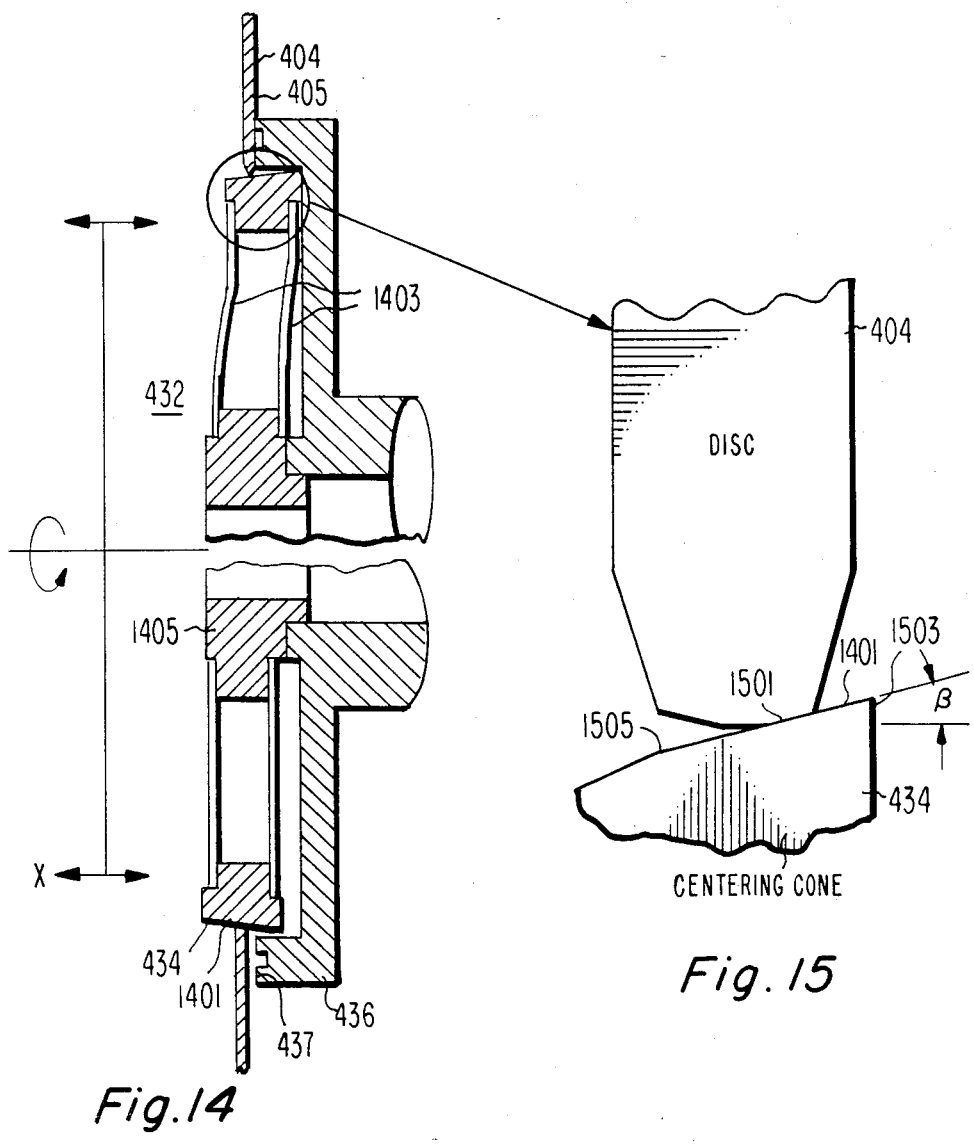
FIGS. 14, 15 and 16 show details of the spindle centering arrangement embodying the principles of the present invention.
Figure 16:
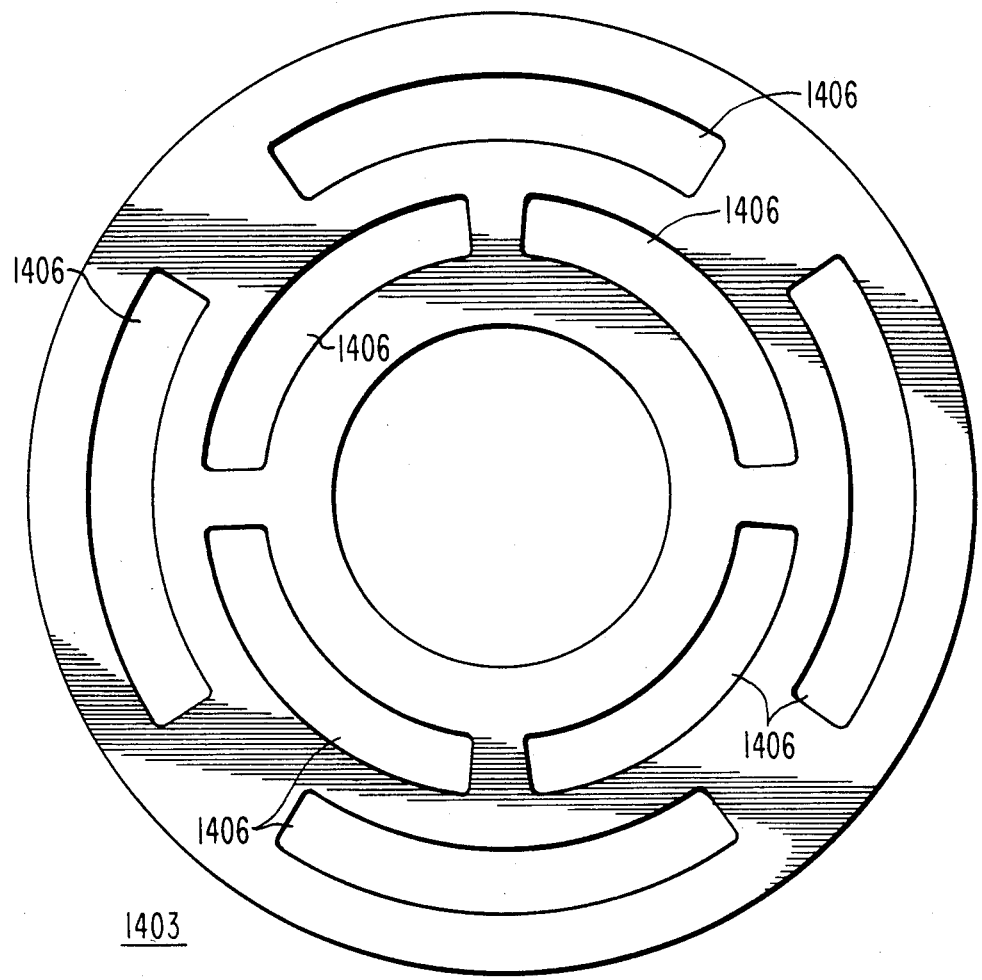

In optical disc systems where the recorded spots are on the order of 0.5 micrometers, it is desirable to have the disc located very accurately so that the recorded tracks are concentric with the center hole therein. In a jukebox operation as described herein the disc will be shuffled between the storage and read/write modules frequently. In addition, a disc recorded on one optical player may be played back on another player. Excessive eccentricity between the center hole and the recorded tracks places a severe burden on the tracking servo, especially when attempting to acquire track. Referring to FIGS. 14 through 16, a disc centering apparatus which allows for disc center hole variations is shown. This centering apparatus provides centering and referencing of the disc in the same position for each play or record operation. Spindle 432 includes hub member 434 and hold-down member 436. Illustratively, hub member 434 may be formed of aluminum having its surface hard coated. The aluminum provides a low inertia mass necessary for fast spin-up while the hard coat minimizes the wear on the cone surface 1401 of hub member 434. The location of disc 404 in the "X" direction is constant because side surface 405 of disc 404 is positioned against flow surface 437 of hold-down member 436.

The eccentricity of the disc from play-to-play is minimized by compensating for the tolerance of the hole in disc 404. The inside surface 1501 of disc 404 is formed at an angle $\beta$ (illustratively, 8°) with respect to a normal to the disc surface. A corresponding angle $\beta$ is formed on the outside surface 1401 of hub member 434. Variations in the diameter of the center hole of disc 404 are compensated for by the mating surfaces 1401 and 1501. As the disc center hole approaches the upper tolerance limit disc 404 slides farther onto hub member 434 near edge 1503 of hub member 434. On the other hand, as the center hole approaches the lower tolerance limit disc 404 is positioned near edge 1505.

Hub member 434 is supported by two diaphragms 1403 coupled to shaft 1405. The two diaphragms 1403 permit the centering cone to move axially ("X" direction), however, do not permit the cone to move radially or allow it to tilt about its rotational axis. This results in a very consistent concentric repeatability of the disc when the disc is located on center hub 434. Even though the diameter of the disc locating hole may vary the centering hub 434 has a bevel as shown in the exploded view of FIG. 15 to contact the inside hole of disc 404. Illustratively, the diaphragms may be made of 20 mils thick, half hard, ultra-flat aluminum sheet. The parallelogramatic arrangement of diaphragms 1403 eliminates or reduces the familiar "oil canning" difficulty associated with materials that are heat treated to become springs. "Oil canning" provides for a non-flat, non-uniformly curved surface which, when combined in parallel with another surface, may introduce resultant radial displacements which may adversely affect the location of the disc in the radial direction. So long as the proportional limit of the aluminum diaphragms is not exceeded, they should return to their original location following deflection. The force that is generated by the diaphragms in the "X" direction may be varied by cutting slots 1406 into the diaphragms as shown in FIG. 16.

Other embodiments of the invention will be apparent to those skilled in the art. For example, the ejector assembly could operate in a manner such that the tapered pins are driven into engagement with the disc rather than being driven out of engagement. Further, the vacuum disc hold-down of the spindle assembly could be replaced with a mechanical hold-down which may be provided by the vacuum cup assembly.

What is claimed is:

1. In a data processing system for use with a disc-shaped record medium, the data processing system including a storage module having a plurality of storage locations for storing record media and a user station for recording information on and playing back information from a recording surface of said record medium, an apparatus comprising:

transporting means for transporting said record media from said storage module to an incoming position proximate said user station and from an outgoing position proximate said user station to said storage module, said transporting means including a first transfer means for transferring a selected record medium from a storage location of said storage module to said incoming position and a second transfer means for transferring said selected record medium from said outgoing position to a storage location of said storage module;

means for conveying said selected record medium from said incoming position to said user station, said conveying means including attachment means for holding said selected record medium while said selected record medium is conveyed from said incoming position to said user station;

ejector means for transferring said selected record medium from said user station to said outgoing position; and alignment means for aligning said selected record medium as said selected record medium is conveyed from said incoming position to said user station, said alignment means including spring means for maintaining said selected record medium in said incoming position while said attachment means engages said selected record medium and for releasing said selected record medium from said incoming position while said conveying means conveys said selected record medium to said user station, said alignment means aligning said selected record medium as said ejector means transfers said selected record medium from said user station to said outgoing position, said spring means preventing said record medium from being transferred into said incoming position from said outgoing position.

2. The apparatus according to claim 1 wherein said data processing system further includes a protective cartridge for housing said selected record medium therein, said protective cartridge including releasable engagement means for holding said selected record medium in said protective cartridge such that said recording surface of said record medium is spaced from a surface of said protective cartridge adjacent said recording surface, said apparatus further comprising:

release means for activating said releasable engagement means, said release means being operable in a first mode for affecting said releasable engagement means such that said selected record medium is held in said protective cartridge with said recording surface spaced from said adjacent surface.

3. The apparatus according to claim 2 wherein said record medium includes a center hole, said apparatus further comprising:

spindle means for supporting said record medium in a play/record position in said user station, said spindle means including a tapered centering plug which engages said center hole in said record medium, said tapered centering plug having a rotary axis which is coincident with a rotary axis of said disc-shaped record medium and a pair of diaphragms connected to said tapered centering plug in parallelogrammatic fashion such that said pair of diaphragms restricts motion of said tapered centering plug to motion parallel to said rotary axis of said tapered centering plug.

4. The apparatus according to claim 3 wherein said tapered centering plug has the shape of a truncated cone.

5. In a data processing system for use with a disc-shaped record medium, the data processing system including a storage module having a plurality of storage locations for storing record media and a user station for recording information on and playing back information from a recording surface of said record medium, an apparatus comprising:

transporting means for transporting said record media from said storage module to an incoming position proximate said user station and from an outgoing position proximate said user station to said storage module, said transporting means including a first transfer means for transferring a selected record medium from a storage location of said storage module to said incoming position and a second transfer means for transferring said selected record medium from said outgoing position to a storage location of said storage module;

means for conveying said selected record medium from said incoming position to said user station, said conveying means including attachment means for holding said selected record medium while said selected record medium is conveyed from said incoming position to said user station;

a protective cartridge for enclosing said selected record medium said protective cartridge including releasable engagement means for holding said selected record medium in said protective cartridge such that said recording surface of said record medium is spaced from a surface of said protective cartridge adjacent said recording surface; and release means for activating said releasable engagement means and for ejecting said selected record medium from said user station to said outgoing position, said release means being operable in a first mode for affecting said releasable engagement means such that said selected record medium is free to rotate within said protective cartridge and being operable in a second mode for affecting said engagement means such that said selected record medium is held in said protective cartridge with said recording surface spaced from said adjacent surface.

6. The apparatus according to claim 5 wherein said record medium includes a center hole, said apparatus further comprising:

spindle means for supporting said record medium in a play/record position in said user station, said spindle means including a tapered centering plug which engages said center hole in said record medium, said tapered centering plug having a rotary axis which is coincident with a rotary axis of said disc-shaped record medium and a pair of diaphragms connected to said tapered centering plug in parallelogrammatic fashion such that said pair of diaphragms restricts motion of said tapered centering plug to motion parallel to said rotary axis of said tapered centering plug.

7. The apparatus according to claim 6 further comprising:

alignment means for aligning said selected record medium as said selected record medium is conveyed from said incoming position to said user station, said alignment means including spring means for maintaining said selected record medium in said incoming position while said attachment means engages said selected record medium and for releasing said selected record medium from said incoming position while said conveying means conveys said selected record medium to said user station, said alignment means aligning said selected record medium as said selected record medium is ejected from said user station to said outgoing position, said spring means preventing said record medium from being transferred into said incoming position from said outgoing position.

8. The apparatus according to claim 7 wherein said tapered centering plug has the shape of a truncated cone.

9. In a data processing system for use with a disc-shaped record medium, said record medium including a center hole, the data processing system including a storage module having a plurality of storage locations for storing record media and a user station for recording information on and playing back information from a recording surface of said record medium, an apparatus comprising:

transporting means for transporting said record media from said storage module to an incoming position proximate said user station and from an outgoing position proximate said user station to said storage module, said transporting means including a first transfer means for transferring a selected record medium from a storage location of said storage module to said incoming position and a second transfer means for transferring said selected record medium from said outgoing position to a storage location of said storage module;

means for conveying said selected record medium from said incoming position to said user station, said conveying means including attachment means for holding said selected record medium while said selected record medium is conveyed from said incoming position to said user station; and spindle means for supporting said selected record medium in a play/record position in said user station, said spindle means including a tapered centering plug which engages said center hole in said selected record medium, said tapered centering plug having a rotary axis which is coincident with a rotary axis of said selected record medium and a pair of diaphragms connected to said tapered centering plug in parallelogrammatic fashion such that said pair of diaphragms restricts motion of said tapered centering plug to motion parallel to said rotary axis of said tapered centering plug.

10. The apparatus according to claim 9 wherein said data processing system further includes a protective cartridge for housing said selected record medium therein, said protective cartridge including releasable engagement means for holding said selected record medium in said protective cartridge such that said recording surface of said record medium is spaced from a surface of said protective cartridge adjacent said recording surface, said apparatus further comprising:

release means for activating said releasable engagement means and for ejecting said selected record medium from said user station to said outgoing position, said release means being operable in a first mode for affecting said releasable engagement means such that said selected record medium is free to rotate within said protective cartridge and being operable in a second mode for affecting said releasable engagement means such that said selected record medium is held in said protective cartridge with said recording surface spaced from said adjacent surface.

11. The apparatus according to claim 10 further comprising:

alignment means for aligning said selected record medium as said selected record medium is conveyed from said incoming position to said user station, said alignment means including spring means for maintaining said selected record medium in said incoming position while said attachment means engages said selected record medium and for releasing said selected record medium from said incoming position while said conveying means conveys said selected record medium to said user station, said alignment means aligning said selected record medium as said selected record medium is ejected from said user station to said outgoing position, said spring means preventing said record medium from being transferred into said incoming position from said outgoing position.

12. The apparatus according to claim 11 wherein said tapered centering plug has the shape of a truncated cone.

* * * * *